United States Patent

Esch

[15] 3,636,814

[45] Jan. 25, 1972

[54] APPARATUS FOR AND METHOD OF CHECKING A TOOL OF A NUMERICALLY CONTROLLED MACHINE

[72] Inventor: Robert E. Esch, Dayton, Ohio
[73] Assignee: The Bendix Corporation
[22] Filed: Nov. 26, 1969
[21] Appl. No.: 880,039

[52] U.S. Cl. ................................90/11 R, 90/11 C, 90/13 C, 33/201, 82/1 R, 408/8
[51] Int. Cl. ..........................................................B23c 9/00
[58] Field of Search .....................90/11 R, 11 C, 13 C; 77/1, 77/5 B; 33/201, 185; 83/62; 82/1 R

[56] References Cited

UNITED STATES PATENTS

| | | | |
|---|---|---|---|
| 3,339,434 | 9/1967 | Sparling | 77/5.2 |
| 3,124,976 | 3/1964 | Pittwood | 90/13 CX |
| 3,109,329 | 11/1963 | Knosp et al. | 90/13 C |
| 3,241,451 | 3/1966 | Williamson | 90/11 R |
| 3,395,283 | 7/1968 | Sefton et al. | 250/210 |

*Primary Examiner*—Gil Weidenfeld
*Attorney*—Candor, Candor & Tassone, William F. Thornton and Plante, Hartz, Smith & Thompson

[57] ABSTRACT

A switch apparatus is provided and mounted on a numerically controlled machine having a programmer and a tool mounted in an associated tool holder. The tool holder with its tool and switch apparatus are relatively moved in operative association by moving means comprising the machine in accordance with a predetermined sequence provided by the programmer and the switch apparatus and programmer cooperate to stop the programmer and moving means in the event the size and/or setting of the tool is incorrect.

22 Claims, 7 Drawing Figures

INVENTOR
ROBERT E. ESCH

BY Candor, Candor & Tassone
HIS ATTORNEYS

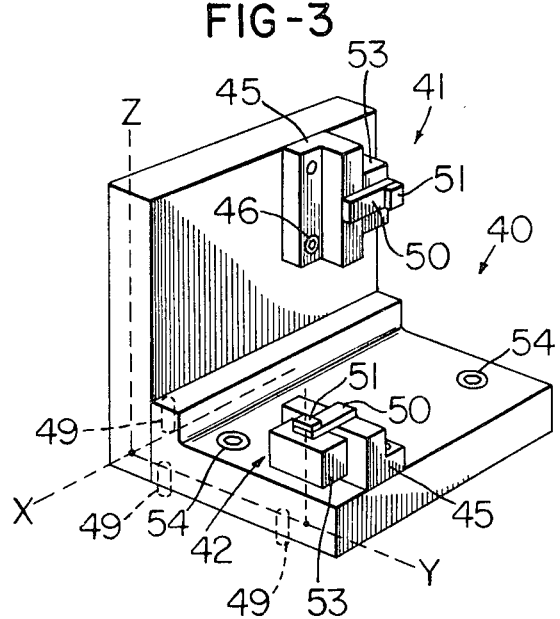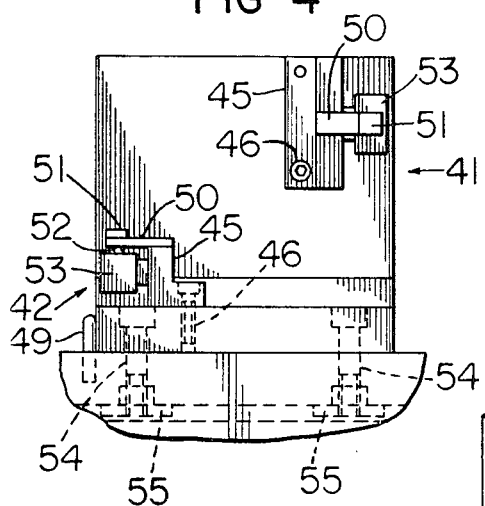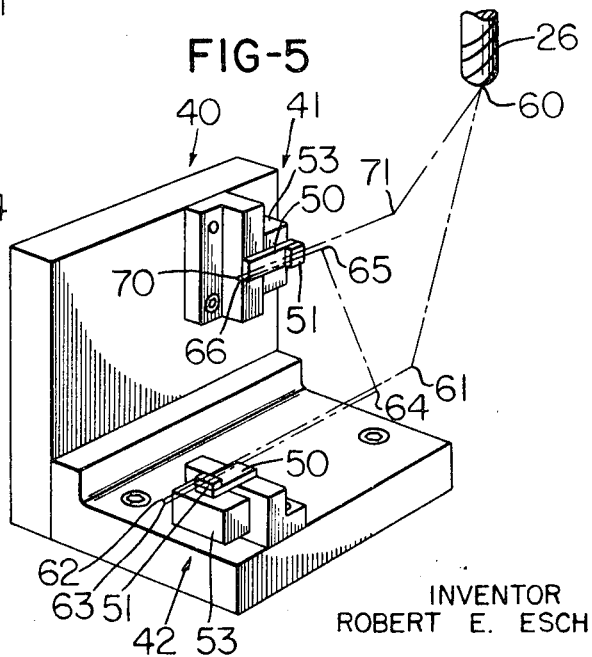

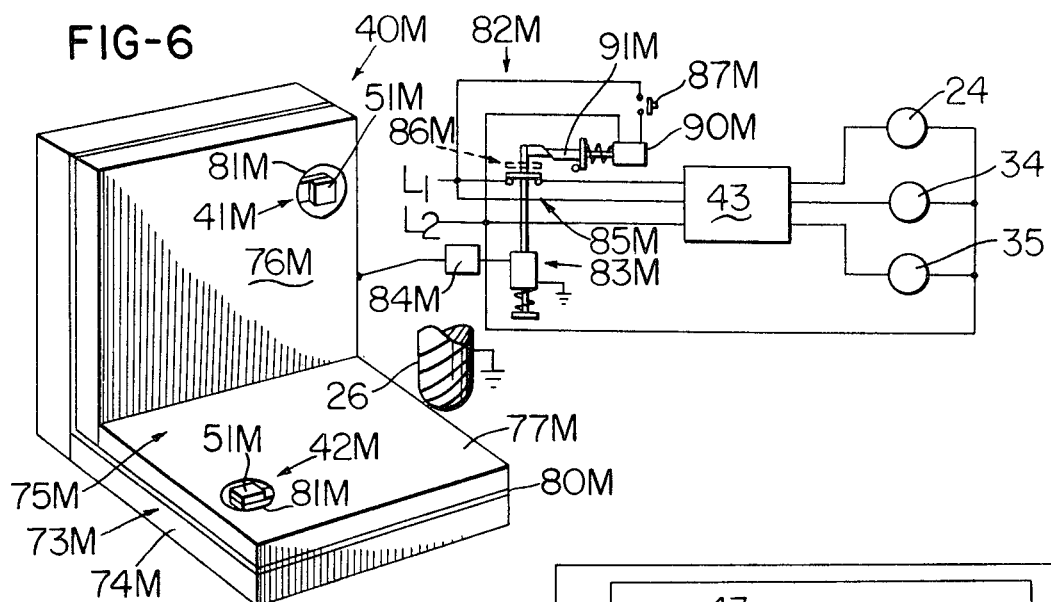
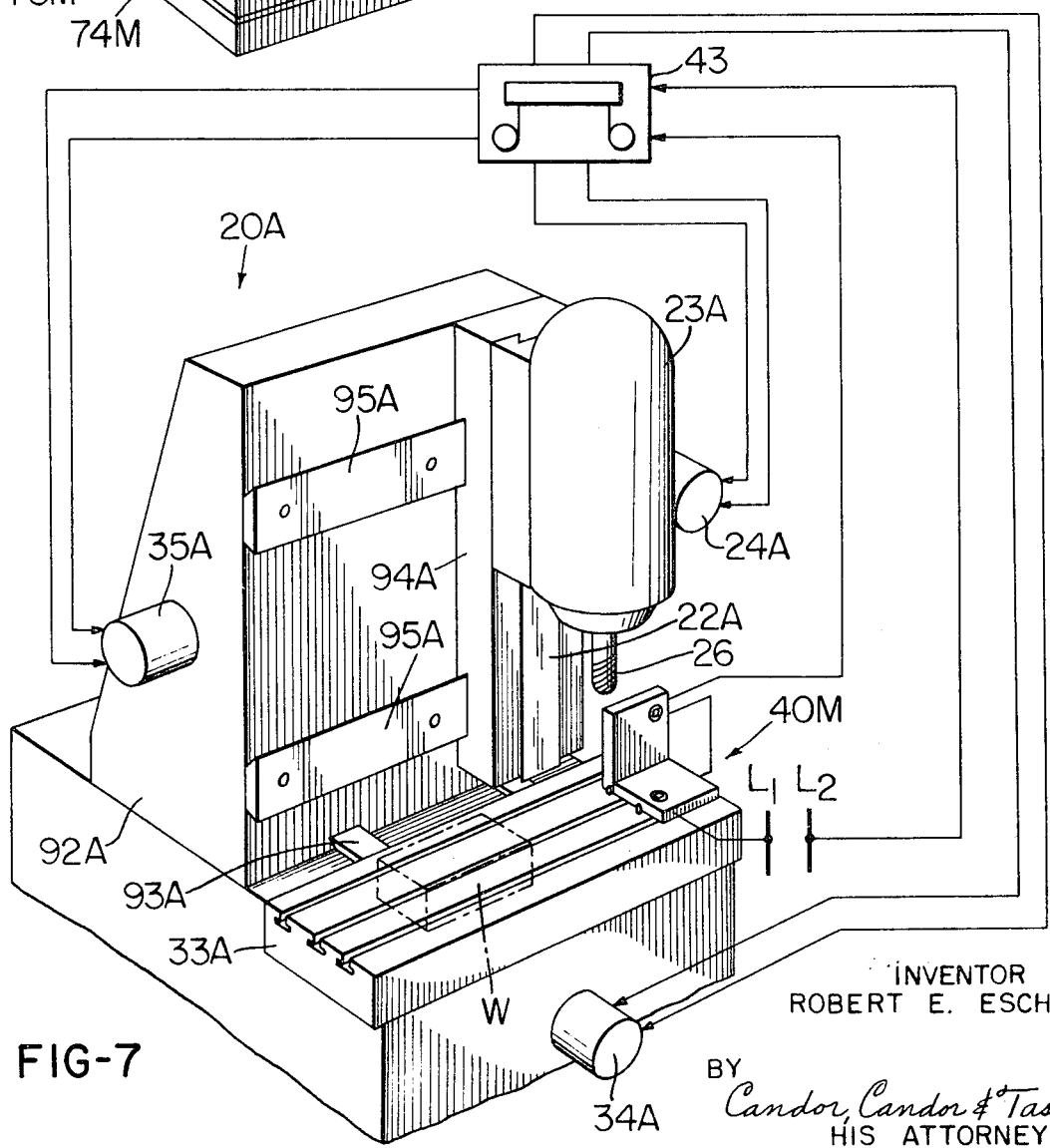

APPARATUS FOR AND METHOD OF CHECKING A TOOL OF A NUMERICALLY CONTROLLED MACHINE

BACKGROUND OF THE INVENTION

Numerically controlled machines are presently used quite extensively in industry. However, with present machines it is impossible to rapidly and accurately determine if the size and/or setting of an associated tool installed in a tool holder of a particular machine is correct whereby the machine must be kept idle for unnecessarily long periods of time to enable manual checking of the size and setting of each tool which is installed for use in such machine.

SUMMARY

This invention provides an improved apparatus for and method of rapidly checking the size and setting of a tool used in a numerically controlled machine which is automatically operated by a programmer. The machine has switch means suitably mounted thereon and a tool which is mounted in an associated tool holder whereupon the tool holder with its tool and switch means are relatively moved in operative association by moving means comprising the machine in accordance with a predetermined automatic sequence provided by the programmer. The switch means and programmer cooperate to stop such programmer and moving means in the event the size and/or setting of a particular tool being checked is incorrect.

Other details, uses, and advantages of this invention will become apparent as the following description of the exemplary embodiments thereof presented in the accompanying drawings proceeds.

BRIEF DESCRIPTION OF THE DRAWINGS

The accompanying drawings show present exemplary embodiments of this invention, in which

FIG. 3 is an enlarged perspective view of a setting fixture used on the machine of FIG. 1 and which has electrical switch assemblies mounted thereon which are used to check the size and setting of a tool mounted in a tool holder of such machine;

FIG. 4 is a front view of the fixture of FIG. 3 which also shows a fragmentary portion of the worktable of the machine of FIG. 1 and the manner in which the fixture is installed on such worktable;

FIG. 5 is a perspective view of the setting fixture of FIG. 3 and particularly illustrating a series of relative movements provided by the programmer between the fixture with its switches and the tool of the machine of FIG. 1 to provide automatic checking of the size and setting of such tool;

FIG. 6 is a view illustrating another exemplary embodiment of a fixture of this invention which may be utilized interchangeably with the fixture of FIG. 3 on an associated numerically controlled machine and also schematically illustrating electrical circuitry and components used in association with such fixture; and FIG. 7 is a perspective view which is similar to FIG. 1 and illustrating another exemplary numerically controlled machine which also uses the improved apparatus and method of this invention.

DESCRIPTION OF ILLUSTRATED EMBODIMENTS

Figure 1:
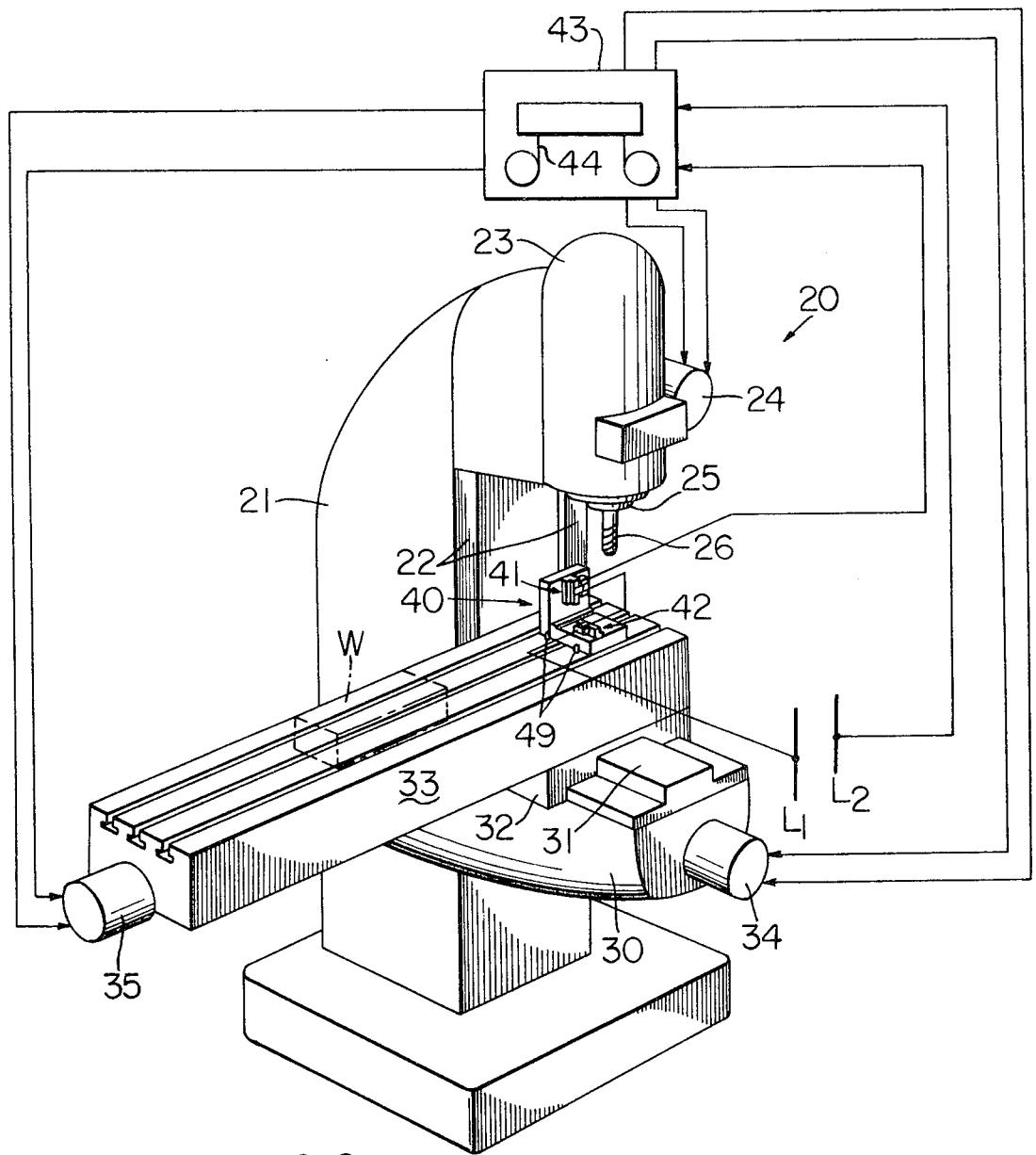
FIG. 1 is a perspective view, with certain parts shown schematically, of an exemplary numerically controlled milling machine which utilizes one exemplary embodiment of this invention.

Reference is now made to FIG. 1 of the drawings, which illustrates an exemplary numerically controlled milling machine 20 which utilizes the apparatus and method of this invention. The machine 20 has a base provided with a vertical column 21 which has fixed vertical ways 22 on the upper portion thereof which carry a head assembly 23. The head assembly 23 is moved vertically upwardly and downwardly by an electric motor 24 and carries a tool holder 25 which has a suitable operating agency or tool in the form of a cutting tool or cutter 26 attached thereto in any suitable manner.

The column 21 has a supporting structure 30 fixed thereto and extending outwardly from the lower portion thereof and structure 30 has a horizontal way 31 which supports a slide 32 for horizontal movement toward and away from the vertical column 21. A worktable 33 is provided and supported for sliding movement on the slide 32 in a direction generally perpendicular to the direction of movement of the slide 32. An electric motor 34 is provided for moving the slide 32 with respect to the horizontal way 31 and an electric motor 35 is provided for moving the worktable 33 relative to the slide 32, whereby the electrical motors 24, 34, and 35 comprise moving means for the machine 20.

The apparatus of this invention comprises a setting fixture 40 which is suitably fixed at a predetermined known position such as on the worktable 33 of machine 20 and the fixture 40 has switch means shown as a pair of electrical switch assemblies 41 and 42 each suitably mounted thereon and for a purpose to be subsequently described. The numerically controlled machine 20 has a programmer 43 which may be of any suitable known construction and the programmer controls the moving means for the machine 20 and comprised of motors 24, 34 and 35 to thereby move the tool 26 and switch assemblies 41 and 42 in operative association with each other.

It should be appreciated that any numerically controlled machine, such as machine 20, inherently has a precision measuring system provided as an integral part thereof, which enables precise movement of an associated tool relative to another component such as fixture 40. This invention enables efficient utilization of such measuring system with a minimum amount of additional equipment.

The switch assemblies 41 and 42 are contact type switch assemblies and cooperate with suitable control logic comprising the programmer to stop automatic operation thereof and the motors 24, 34, and 35 in the event the tool is unacceptable for continued operation of the machine. In particular, the programmer with its control logic, upon receiving the appropriate signals from the switch assemblies 41 and 42, automatically stops the moving means or motors 24, 34 and 35 and switches to manual mode, i.e., requires manual reactuation, in the event the size and/or setting of the cutting tool is incorrect; however, even though the programmer switches to manual mode, it is still continuously supplied with power. It will be appreciated that in the event the machine 20 is operated with a tool 26 of incorrect size and/or setting, such tool would operate in an improper operating zone and an associated workpiece would not be machined correctly, resulting in wasted machine time, the making of defective parts, and unnecessary operating expenses.

Numerical control as used in this specification refers to the use of stored data to control the various positions of relatively movable components of a particular machine such as, for example, the positions of the head assembly 23, worktable 33, and slide 32 of the machine 20. The data which provides automatic control may be stored using any suitable known programming means or technique such as on magnetic tape, punched cards, punched tape, or the like and in this disclosure of the invention the programming means is shown in the form of a punched tape 44 which is easily installed in and removed from the programmer.

Figure 2:
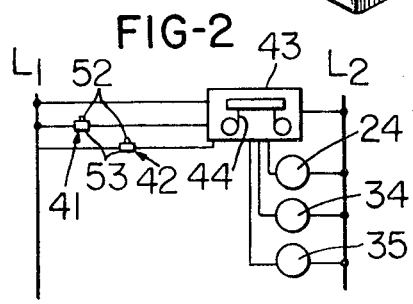
FIG. 2 is a simple electrical diagram schematically illustrating one exemplary arrangement of switch means of the apparatus of this invention operatively connected to a programmer and associated moving means comprising the machine of FIG. 1.

As seen particularly in FIG. 3 of the drawings, each switch assembly 41 and 42 comprises a support block 45 fixed to an associated portion of the fixture 40 by threaded screws 46 and each block 45 has a deflectable blade 50 suitably fixed against the top outer surface thereof. The blade 50 has a carbide locating pad 51 fixed to its top outer end portion and upon engagement of the pad 51 by the cutting tool 26 the blade 50 is deflected inwardly against an upstanding pin 52 (see FIG. 2)

of an electrical switch 53 having normally closed contacts to open such contacts.

The switch assemblies 41 and 42 are suitably connected between electrical power supply lines $L_1$ and $L_2$ and provide signals to the control logic portion of the programmer 43 which is also connected between lines $L_1$ and $L_2$. The electric motors 24, 34, and 35 are operatively connected between the programmer 43 and the electrical supply line $L_2$ whereby the programmer opens the circuit to such motors and switches to manual mode, as previously indicated, in the event the tool size and/or setting is improper. A typical automatic sequence of a tool used to determine its size and/or setting will be described in detail subsequently.

The fixture 40 is precisely located on the worktable 33 through the use of locating pins 49 which are precisely positioned on such worktable, see FIGS. 1, 3, and 4. A plurality of threaded bolts 54 are provided with cooperating T-shaped nuts 55 and once the fixture 40 is suitably positioned against the locating pins 49 using suitable precision measuring instruments, each bolt 54 is suitably threaded within its associated nut 55 to hold the fixture 40 and hence the switch assemblies 41 and 42 in precisely determined positions on the worktable 33.

The use of the apparatus and method of this invention enables the tape 44 to be provided with a test section so that once a machine operator installs an associated tool 26 in its tool holder 25 the programmer operates the motors 24, 34, and 35 to automatically determine (at a speed compatible with the high speed operation of a numerically controlled machine) whether the proper tool has been installed in the tool holder 25 for the given program which comprises that portion of the tape 44 following the test section. It may also be desirable in some applications, for ease of programming, to incorporate a test section in the programmer which automatically executes some of the test or checking commands which might otherwise be programmed on the tape. The programmer controls the motors 24, 34, and 35 so as to provide a first relative movement of the tool and each switch assembly, 41 or 42, past each other, followed by the positioning of the tool and each switch assembly closer together and then followed by a second relative movement of the tool and each switch assembly past each other.

In particular, the checking section of tape 44 provides movements in the manner illustrated in FIG. 5 of the drawings whereby the fixture 40 and its associated switch assemblies 41 and 42 enable the checking of both the length setting of the cutting tool 26, i.e., extension of such tool outwardly of its tool holder 25, as well as the diameter of such tool and the detailed description will proceed by first describing a procedure for checking the extension of the terminal end of such tool followed by a check of the diameter thereof.

Before commencing the check of the tool length setting, the programmer may, if desired, be set to automatically stop rotation of the rotatable tool holder to thereby stop rotation of the cutting tool 26. The programmer then turns off any coolant provided in the area of the cutting tool 26 and causes the motors 24, 34, and 35 to operate at comparatively high speed to automatically relatively position the tool 26 and switch assembly 42 so that if a correct tool is installed in position the terminal outer end thereof is located in a horizontal plane 0.001 inch vertically above and is also displaced in the horizontal plane by a distance greater than the tool diameter away from the switch assembly 42 whereby the tool 26 is relatively positioned from a point indicated at 60 to a point 61 in FIG. 5. What may be conventionally considered an X axis movement is then provided by the programmer energizing the motor 35 to move the worktable 33 so that the switch assembly 42 is moved past the cutting tool 26 to a position 62. If the terminal end of the cutting tool 26 engages the pad 51 sufficiently to deflect blade 50 and energize the associated switch 53 during movement from point 61 to point 62, this indicates that the cutting tool is either too long or is fastened in position so that it extends outwardly too far whereupon the control logic in the programmer 43 automatically stops the programmer and requires manual restarting of such programmer thereby enabling the cutting tool to be changed or reset, as required.

If the switch 53 is not actuated by the axis movement from point 61 to point 62, the programmer operates to automatically provide what may be conventionally considered a Z axis movement to position the terminal end of the cutting tool 26 0.001 inch closer to the switch assembly 42 by energizing the motor 24 whereby the terminal end of the cutting tool 26 is positioned to a new point 63. The programmer 43 then operates to provide an X axis movement of the worktable 33 by energizing the motor 35, causing the switch assembly 42 to be moved past the terminal end of the cutting tool 26 from point 63 to new point indicated by the reference numeral 64.

If the electrical switch 53 is not actuated during this movement, it indicates that the cutting tool 26 is not of sufficient length, whereupon the control logic in the programmer automatically stops the programmer, requiring that it be manually restarted once the necessary tool corrections have been made.

However, if the cutting tool 26 actuates switch 53 during movement of switch assembly 42 from point 63 to point 64, this indicates that the tool is acceptable as to length, whereupon the programmer may be set to relatively move the associated components so that the cutting tool is again located at point 60 relative to switch assembly 42 to enable automatic operation as determined by the tape 44 or the programmer may be programmed to make a diameter check of the tool 26.

In this example of the invention the programmer simultaneously energizes motors 24 and 34 to provide Z axis movement of tool 26 and what may be considered Y axis movement of the slide 32 whereby the cutting tool 26 is relatively moved from point 64 to a new point 65 so that an inner peripheral side edge of tool 26 is contained in a lane parallel to and spaced 0.001 inch perpendicularly outwardly of an X,Z plane containing the outer surface of the pad 51 comprising the switch assembly 41. At point 64 the inner peripheral side edge of tool 26 is also preferably horizontally displaced in the parallel plane by a distance greater than a tool diameter away from the switch assembly 41. With the tool 26 relatively positioned at point 65 prior to initiating the diameter check, the programmer 43 is set to start automatic rotation of the drive for the cutting tool 26, preferably at a speed lower than its normal operating speed.

The programmer then automatically provides an X axis movement of the worktable 33 by energizing the motor 35 to move the switch assembly 41 from point 65 to point 66. If the diameter of the cutting tool 26 is large enough to deflect blade 50 of switch assembly 41 and energize its associated switch 53, the control logic in the programmer causes the programmer and motor 35 to stop automatically indicating that the cutting tool 26 is of excessive diameter and requiring that the programmer be manually restarted upon installing another cutting tool in tool holder 25 for automatic checking.

If the blade 50 of switch assembly 41 is not deflected to actuate its associated switch 53 during movement of assembly 41 from point 65 to point 66 the programmer energizes the motor 34 to provide Y axis movement of slide 32 and worktable 33 from point 66 to a new point 70 and thereby relatively position the cutting tool 26 0.001 inch closer to the switch assembly 41. The programmer then operates to provide an X axis movement of the worktable 33 by energizing motor 35, causing the switch assembly 41 to move past the cutting tool 26 from point 70 to a new point 71.

If the cutting tool 26 does not actuate the electrical switch 53 of switch assembly 41 during movement of assembly 41 from point 70 to point 71, the programmer 43 and motor 35 are automatically stopped by the control logic in the programmer, indicating that the outside diameter of the cutting tool 26 is too small and requiring that a new tool be installed in tool holder 25.

If the cutting tool 26 actuates the switch 53 during movement of assembly 41 from point 70 to point 71, this indicates that the tool diameter is acceptable and the programmer will either relatively position the tool 26 to the original starting point 60 or to a new position as determined by the tape 44 whereupon the machine 20 will continue normal operation under tape command.

In this presentation of the invention each switch assembly 41 and 42 uses a contact-type electrical switch 53 which is actuated by the tool 26 engaging pad 51 and deflecting an outwardly urged spring blade 50 a predetermined amount. However, if desired, the spring blade 50 may be replaced with a compression spring, or the like, which normally urges an associated pad 51 outwardly and in this latter construction the lower surface of such pad may be used to contact and actuate the switch 53. It will also be appreciated that suitable noncontact-type electrical switch assemblies may be used in lieu of assemblies 41 and 42 and such switch assemblies would also perform substantially the same functions as assemblies 41 and 42 without requiring that the tool 26 actually contact an associated pad, such as pad 51.

Each switch assembly 41 and 42 may be readily assembled and precisely installed on the fixture 40 with the fixture suitably installed on its associated worktable using available precision measuring instruments. Further, each switch assembly 41 and 42 may be installed to assure that the desired deflection of blade 50 provides actuation of the associated switch 53.

Another exemplary embodiment of a tool setting fixture is illustrated in FIG. 6 of the drawings. The fixture illustrated in FIG. 6 is similar to the fixture 40; therefore, such fixture will be designated generally by the reference numeral 40M and parts of the fixture 40M which are very similar to the corresponding parts of the fixture 40 will be designated by the same reference numeral as in the fixture 40, also followed by the letter designation M and not described again. Only those component parts of the fixture 40M which are substantially different from corresponding parts of the fixture 40 will be designated by a new reference numeral also followed by the letter designation M and described in detail. The main difference between the fixture 40 and the fixture 40M is that the fixture 40M has component portions and an associated electrical system which are designed to inherently protect such fixture against any malfunction of the programmer and/or machine malfunction.

In particular, it will be seen that the fixture 40M has a precisely made support 73M which in this example is substantially L-shaped and has a lower portion 74M which is adapted to be installed in position through the use of locating pins 49 in a similar manner as the fixture 40 shown in FIG. 1. The precisely made L-shaped support 73M also supports associated electrical switch assemblies 41M and 42M, which are substantially identical to switch assemblies 41 and 42 respectively.

The fixture 40M also has a protective pad 75M comprised of a pair of cooperating portions 76M and 77M arranged in a substantially L-shaped configuration corresponding to the general configuration of the support 73M and the pad 75M is made of an inexpensive, comparatively soft electrically conductive material. Each portion 76M and 77M of pad 75M is suitably electrically insulated from the support 73M by a suitable electrical insulating material or insulator 80M.

Each switch assembly 41M and 42M is suitably supported so that its associated pad 51M extends through and outwardly of an associated opening 81M in its portion 76M and 77M respectively of pad 75M to enable operation of each switch assembly 41M and 42M in substantially the identical manner as described in detail in connection with switch assemblies 41 and 42.

An electrical system 82M is provided and operatively connected between the programmer 43, cutting tool 26, and protective pad 75M so that upon using fixture 40M on the machine 20 and in the event of a malfunction such as a program error by the programmer 43 and movement of the tool 26 against or into the pad assembly 75M an electrical circuit operates to stop the automatic programmer 43 and stop operation of the associated moving means for the machine 20. Thus, relative movement between the fixture 40M and the cutting tool 26 is stopped and any damage or deformation is limited to the inexpensive pad assembly 75M while keeping the cutting tool 26 and precision lower support 74M with associated switches 41M and 42M of fixture 40M substantially intact.

The electrical system 82M comprises a latching relay 83M which is provided with power from a separate low-voltage DC source 84M (for operator safety) and once the cutting tool 26 engages the conductive pad assembly 75M an electrical circuit is completed therethrough and through the latching relay 83M, causing contacts 85M of the latching relay to move to a dotted line position indicated at 86M and thereby signals the programmer 43 to thereby stop the moving means (i.e., motors 24, 34, and 35) of machine 20 commanded thereby. The latching relay 83M has a manually operated reset button 87M of known construction which is supplied with power from lines $L_1$ and $L_2$ and upon manual actuation of button 87M a solenoid 90M retracts a blade 91M of the latching relay allowing the contacts 85M to return to their normally closed positions to enable normal operation of such programmer and machine 20 after correction of any malfunction.

In the exemplary fixture 40M described above, only the front and top portions of such fixture are protected against programmer and/or machine malfunction. However, it is to be understood that the entire fixture may be suitably protected. Thus, if the tool were to approach the fixture from the rear, for example, protection would still be provided.

The exemplary apparatus and method illustrated in FIG. 1 is utilized in connection with a milling machine 20 which has a head assembly 23 which is movable vertically and which has a worktable which is movable in two mutually perpendicular directions, i.e., along the X and Y axes. However, it will be appreciated that the apparatus and method of this invention may be also utilized in connection with a machine which has a head assembly and hence an associated tool carried thereby which is capable of being moved relative to three mutually perpendicular axes either simultaneously or in any desired sequential manner.

In particular, reference is now made to FIG. 7 of the drawings which illustrates a machine in the form of a milling machine which is similar to the milling machine 20; accordingly, the machine of FIG. 7 will be designated generally by the reference numeral 20A and those component parts thereof which are very similar to corresponding parts of the machine 20 will be designated by the same reference numeral as in the machine 20 also followed by the letter designation A and not described again. Further, the operation of similar component parts previously described in connection with the milling machine 20 is very similar to the previous description and will not be repeated.

The milling machine 20A has its worktable 33A supported at a fixed position on the base and the workpiece W may be suitably fixed to the worktable 33A in any known manner.

Y-axis motion is provided in the machine 20A by a motor 34A moving a carriage 92A along ways 93A, X axis motion is provided by a motor 35A moving a slide 94A on ways 95A fixed on the carriage 92A, and Z-axis motion is provided by a motor 24A moving head assembly 23A along vertical ways 22A.

The manner in which the cutting tool 26 of machine 20A is checked as to length and/or diameter is substantially identical to the manner in which such tool is checked on the milling machine 20, as described in connection with FIG. 5 of the drawings, and hence will not be repeated. Further, it will also be appreciated that either checking fixture 40 or 40M may be utilized on the machine 20A and in this example of the invention checking fixture 40M is illustrated as being installed in position.

In this example of the invention the length and diameter checks were described as being made by first relatively moving the cutting tool 26 and associated switch assembly past each other and then relatively positioning the cutting tool 26 and switch assembly closer together a predetermined increment of 0.001 inch whereupon the cutting tool and associated switch assembly were again moved past each other. However, it will be appreciated that the amount and manner that a given tool 26 and an associated switch assembly are relatively positioned closer together will vary for each application and be determined by the particular operation being performed by the numerically controlled machine and the type of tool being utilized. For example, in some applications the associated tool and switch assembly instead of being relatively moved closer together 0.001 inch may be relatively moved generally of the order of 0.010 of an inch while in other applications, these components may be similarly relatively moved a large fraction of an inch.

In the above description of the invention, the cutting tool 26 is checked for size and setting prior to commencing operations on an associated workpiece W; however, it will be appreciated that a number of operations may be required on a particular workpiece or such tool may be used on a number of workpieces installed on the machine worktable whereby there will be wear on the tool 26. The programmer 43 or 43A may be provided with suitable checking sections in its associated programming means to periodically check the tool for wear and thereby assure the precision manufacture of parts with optimum efficiency.

The apparatus and method of this invention has been disclosed in this specification as being used in association with a machine tool such as a milling machine. However, it will be appreciated that the technique of this invention may be used with other types of machines to assure that a particular tool being used on the machine is of proper size and setting whether such tool is a cutting tool, inspection tool, inking instrument or other type of tool. For example, typical machines which may utilize the apparatus of this invention include, among numerous others, jig borers, boring mills, milling machines, lathes, grinders, punches, drafting machines, plotter, inspection machines, printed circuit board stuffing machines, and automatic machines for wiring electronic panels.

The improved method and apparatus of this invention may also be used to check tools of machines such as machine tools, measuring machines, drafting machines, and the like which are computer controlled. Even with such computer controlled machines it would be necessary to assure that the correct tool is installed in its tool holder before further operations are continued.

While present exemplary embodiments of this invention, and methods of practicing the same, have been illustrated and described, it will be recognized that this invention may be otherwise variously embodied and practiced by those skilled in the art.

What is claimed is

1. An apparatus for checking the size and setting of a tool mounted in an associated tool holder of a numerically controlled machine during a tool-checking cycle prior to operative association of said tool with a workpiece, said apparatus comprising, switch means, moving means for relatively moving said switch means and tool holder, and programmer means for controlling the operation of said moving means during said tool-checking cycle to move said tool and switch means to known relative positions in operative association with each other, said switch means cooperating with control logic in said programmer means to stop said programmer means and moving means in the event said tool is unacceptable for continued operation of said machine with the acceptability of said tool being based on the state of actuation of said switch means at said known relative positions.

2. An apparatus as set forth in claim 1 in which said switch means comprises electrical switch means and said moving means comprises electrically operated means.

3. An apparatus for checking the size and setting of a tool mounted in an associated tool holder of a numerically controlled machine comprising, switch means, moving means for relatively moving said switch means and tool holder, and programmer means for controlling the operation of said moving means to move said tool and switch means in operative association with each other, said programmer means controlling said moving means so as to provide a first relative movement of said tool and switch means past each other, followed by positioning of said tool and switch means closer together, and then followed by a second relative movement of said tool and switch means past each other, said switch means cooperating with control logic in said programmer means to stop said programmer means and moving means in the event said switch means is actuated by said tool during said first relative movement and is not actuated during said second relative movement to thereby indicate said tool is unacceptable for continued operation of said machine.

4. An apparatus as set forth in claim 1 in which said tool is in the form of a cutting tool.

5. An apparatus as set forth in claim 1 in which said switch means is supported at a fixed position and said moving means comprises means for moving said tool holder and tool relative to three mutually perpendicular axes.

6. An apparatus as set forth in claim 5 in which said switch means comprises contact-type electrical switch means and said moving means comprises a plurality of three electric motors each moving said tool holder with its tool relative to an associated one of said three mutually perpendicular axes.

7. An apparatus as set forth in claim 1 in which said programmer means includes a section especially designed for use with each associated tool to control said moving means based on the known dimensional characteristics of the associated tool.

8. An apparatus for checking the size and setting of a tool mounted in an associated tool holder of a numerically controlled machine comprising, switch means, moving means for relatively moving said switch means and tool holder, and programmer means for controlling the operation of said moving means to move said tool and switch means in operative association with each other, said switch means cooperating with control logic in said programmer means to stop said programmer means and moving means in the event said tool is unacceptable for continued operation of said machine, said switch means comprising a plurality of switch assemblies with each switch assembly indicating a different dimensional characteristic of said tool, said programmer means moving said tool past each switch assembly in accordance with a predetermined sequence.

9. An apparatus as set forth in claim 1 wherein said machine comprises a worktable and said apparatus further comprises, a setting fixture for said switch means having a precisely made support which is set at a predetermined position on said worktable, a protective pad made of an inexpensive comparatively soft electrically conductive material supported in electrically insulated relation on said support, and an electrical system operatively connected to said programmer means, tool, and protective pad so that in the event of a program error by said programmer means and movement of said tool against said pad an electrical circuit is completed to automatically stop said programmer means and moving means to thereby keep said tool, support, and switch means substantially intact with any damage being confined to said inexpensive pad.

10. An apparatus as set forth in claim 9 in which said electrical system comprises a latching relay which is operatively connected to said programmer means and is actuated upon completion of said circuit to provide a signal to said programmer means which operates to stop said moving means.

11. A method of checking the size and setting of a tool mounted in an associated tool holder of a numerically controlled machine having a programmer, said method providing checking of said tool during a tool-checking cycle prior to operative association of said tool with a workpiece and comprising the steps of, mounting switch means on said machine, and relatively moving said switch means and tool holder with moving means comprising said machine and in accordance with a predetermined sequence provided by said programmer to move said switch means and tool to known relative positions in operative association with each other, said switch means cooperating with control logic in said programmer to stop said programmer and moving means in the event said tool is unacceptable for continued operation of said machine with the acceptability of said tool being based on the state of actuation of said switch means at said known relative positions.

12. A method as set forth in claim 11 in which said mounting step comprises mounting electrical switch means having normally closed contacts at a predetermine position on said machine and said relatively moving step comprises aligning and relatively moving said electrical switch means and tool past each other a plurality of times in accordance wit said predetermined sequence to place said electrical switch means in position for possible actuation of its contacts.

13. A method of checking the size and setting of a tool mounted in an associated tool holder of a numerically controlled machine having a programmer, said method comprising the steps of, mounting switch means on said machine, and relatively moving said switch means, and tool holder with moving means comprising said machine and in accordance with a predetermined sequence provided by said programmer to move said switch means and tool in operative association with each other, said relatively moving step comprising the sequential steps of providing a first relative movement of said tool and switch means past each other, positioning said tool and switch means closer together, and then providing a second relative movement of said tool and switch means past each other, said switch means cooperating with control logic in said programmer to stop said programmer and moving means in the event said switch means is actuated by said tool during said first relative movement and is not actuated during said second relative movement to thereby indicate said tool is unacceptable for continued operation of said machine.

14. A method as set forth in claim 11 in which said mounting step comprises precisely mounting said switch means on a worktable of said machine and said relatively moving step comprises relatively moving said worktable and tool holder with said moving means to thereby relatively move said tool and said switch means relative to three mutually perpendicular axes.

15. A method of checking the size and setting of a tool mounted in an associated tool holder of a numerically controlled machine having a programmer, said method comprising the steps of, mounting switch means on said machine, and relatively moving said switch means and tool holder with moving means comprising said machine and in accordance with a predetermined sequence provided by said programmer to move said switch means and tool in operative association with each other, said switch means cooperating with control logic in said programmer to stop said programmer and moving means in the event said tool in unacceptable for continued operation of said machine, said mounting step comprising attaching a plurality of electrical switch assemblies on a setting fixture and mounting said fixture on a worktable of said machine, said relatively moving step comprising relatively moving said tool and each switch assembly into operative association to enable each switch assembly to cooperate with said control logic to perform a certain check on said tool.

16. A method as set forth in claim 11 and comprising the further steps of providing said programmer with removable programming means and providing an initial section in said programming means for checking an associated tool prior to use thereof on an associated workpiece.

17. A method as set forth in claim 16 and comprising the further step of providing a section in said programming means for checking said tool for wear and improper setting after use thereof.

18. A method of checking the size and setting of a tool mounted in an associated tool holder of a numerically controlled machine having a programmer; said method comprising the steps of; mounting switch means on said machine; relatively moving said switch means and tool holder with moving means comprising said machine and in accordance with a predetermined sequence provided by said programmer to move said switch means and tool in operative association with each other; said switch means cooperating with control logic in said programmer to stop said programmer and moving means in the event said tool is unacceptable for continued operation of said machine; and protecting said switch means and tool against damage due to a program error by said programmer; said protecting step comprising, installing a protective pad made of an inexpensive comparatively soft electrically conductive material and in electrically insulated relation around the major portion of said switch means, an operatively connecting an electrical system to said programmer, tool, and protective pad so that in the event of said program error and movement of said tool against said pad an electrical circuit is completed to automatically stop said programmer and moving means to thereby keep said tool and switch means substantially intact with any damage being confined to said inexpensive pad.

19. An apparatus for checking the operating zone of an operating agency mounted for movement relative to a workpiece with said checking being provided during a checking cycle prior to operative association of said operating agency with said workpiece, said apparatus comprising, switch means, means for relatively moving said switch means and the agency, and means operatively associated with said switch and moving means with said operatively associated means controlling the operation of said moving means during said checking cycle to move such agency and switch means to known relative positions in operative association with each other to indicate when the operating zone of the agency is unacceptable for operation on the workpiece with the acceptability of said operating zone being based on the state of actuation of said switch means at said known relative positions.

20. An apparatus as set forth in claim 19 for checking the operating zone of an operating agency which comprises a component of a numerically controlled machine wherein said operatively associated means comprises programmer means.

21. An apparatus as set forth in claim 20 in which said moving means comprises a plurality of electrically operated motors.

22. An apparatus as set forth in claim 21 in which said switch means comprises contact-type electrical switch means.

* * * * *